March 21, 1961 D. L. EMERY ET AL 2,976,230
TAR VAPOR TREATMENT
Filed May 1, 1958
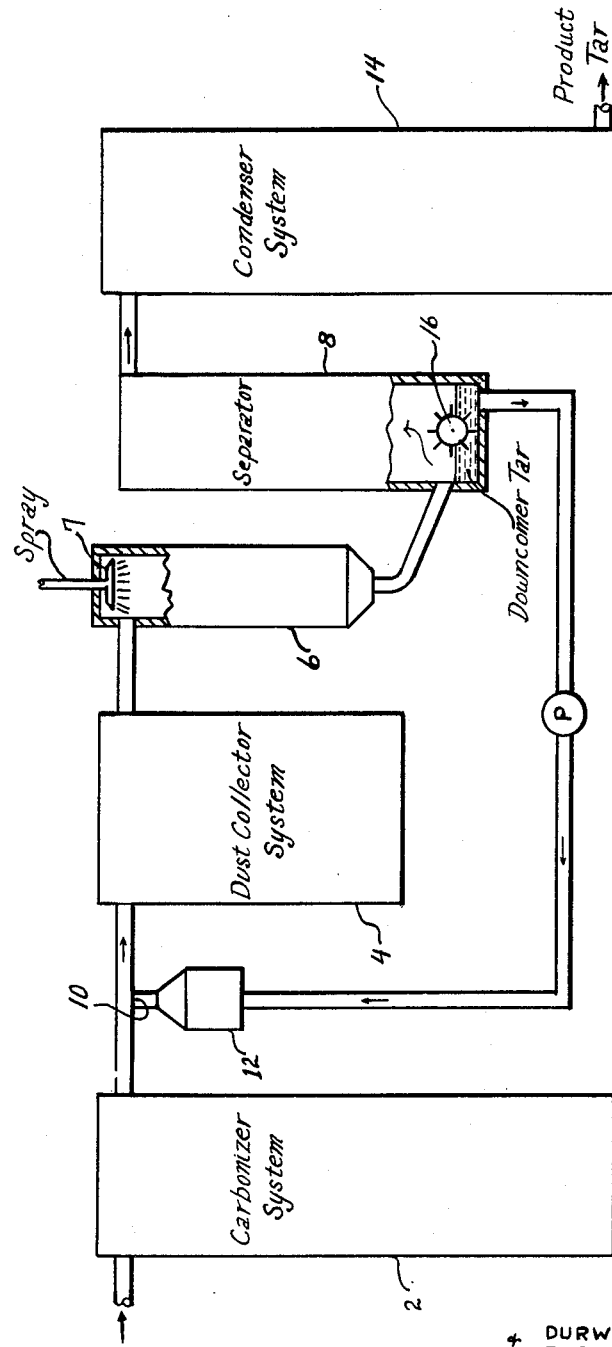
INVENTORS
DURWARD L. EMERY
EUGENE W. BENNETT
BY
Peter L. Costas
ATTORNEY

United States Patent Office 2,976,230
Patented Mar. 21, 1961

2,976,230
TAR VAPOR TREATMENT

Durward L. Emery, St. Clair Township, St. Clair County, Ill., and Eugene W. Bennett, Rockdale, Tex., assignors to Aluminum Company of America, Pittsburgh, Pa., a corporation of Pennsylvania Filed May 1, 1958, Ser. No. 732,283

1 Claim. (Cl. 208—8)

This invention relates to the carbonization of bituminous materials. More particularly, it is directed to the removal of particulate matter from tar vapors produced by the carbonization of bituminous material.

Carbonization of bituminous materials such as peat, brown coal, lignite, sub-bituminous and bituminous coals is a pratice extensively employed for the production of chars or cokes for use as fuel and tars from which valuable products may be obtained.

Especially in carbonization processes employing fluidized or entrained beds, the volatile matter or tar vapor stream from the bituminous material may contain considerable quantities of particulate matter such as ash, mineral matter, char, or the like. Conventional vapor treatments in dust collecting systems remove the greater portion of this particulate; however, substantial amounts remain and contaminate the condensed tar. This particulate matter makes the tar unsuitable for certain uses, such as the production of electrode coke and binder pitch. The present invention is directed to a method for obtaining greater removal of such particulate matter from carbonizer tar streams than is possible by conventional use of the commercial dust collecting equipment.

It has now been found that particulate matter in the tar from carbonization of bituminous materials may be greatly reduced by a method in which the tar vapor stream is treated in a dust collecting system, then rapidly quenched to condense a part of the tar, which is then recycled and vaporized into the tar vapor stream at a point prior to the dust collecting system; the remainder of the tar vapors are subsequently condensed and constitute the product tar. Generally, the amount of tar initially condensed by the quenching and recycled should be between 5 and 60 percent of the total tar content of the vapor stream.

Referring now to the attached drawing, diagrammatically illustrated is a system embodying the present invention.

Tar vapors contaminated with particulate matter leave the carbonizer reactor system 2 and are passed through the dust collecting system 4, which may conveniently be of any conventional type such as cyclones and/or electrostatic precipitators, wherein the greater part of the particulate matter is removed. The vapors are then passed into the downcomer 6 wherein they are rapidly quenched to condense part of the tar, as by injection of a cooling medium through the nozzle 7. This tar (downcomer tar) is removed from the separator 8, recycled and revaporized into the tar vapor stream, from the carbonizer at a point prior to the dust collector system, usually with the aid of a steam dispersion nozzle 12. The tar vapors not condensed in the downcomer are subsequently recovered in the condenser system 14 and constitute the product tar. An agitator 16 is desirably provided in the separator 8 to assist in the vaporization of water from the downcomer tar.

The manner of particular removal is not fully understood; however, it is believed that the rapid quenching of the tar vapors in the downcomer causes tar fog to condense on and wet the particulate matter so that the particles are then heavier and drop out in the bottom of the downcomer. It has been observed that when the particulate matter in the vapor stream is high at this point a large amount of material called "downcomer tar" is collected, while when it is low only a small amount is collected. For instance, in the application of this method to an entrained bed carbonizer for the treatment of lignite at a temperature of about 950° F., it has been observed that when the particulate content after the dust collecting system is only 0.6 grain per cubic foot, the downcomer tar is only about 10% of the total tar and contains about 50% of the total particulate matter in the tar, while when the particulate content equals 3.2 grains per cubic foot the downcomer tar equals about 30% of the total tar and contains about 80% of the total particulate matter. This characteristic of the downcomer, i.e., the quantity of tar collected here depending principally upon the amount of particulate matter in the vapor stream, enables reintroduction of this particulate-laden material into the vapor stream ahead of the dust collecting system, thus giving the latter system a second chance to collect this dust without an appreciable increase in the rate of collection of tar in the downcomer. The balance of the tar stream is subsequently condensed, as well as that recycled tar which passes through the downcomer. Since the major part of the particulate matter leaving the dust collecting system is removed in the downcomer, the subsequently condensed product tar is greatly reduced in particulate matter.

The quenching may be by any means capable of effecting considerable gradients in the temperature of the tar vapor stream by direct or indirect heat exchange. The quenching is expediently accomplished by spraying or feeding a quenching medium directly into the tar vapor stream; for example, water, tar or liquors made in the process may be used, or mixtures thereof. It is preferred to use water because of its availability and ease of handling as well as its high heat of vaporization. Generally, the amount of quenching fluid is determined by the heat required to lower the vapor stream from its initial temperature to a temperature sufficient to condense the desired quantity of downcomer tar and particulate matter. This heat requirement varies with the composition of the tar stream, which in turn varies quite widely with the material being carbonized and the temperature and retention time at which it is carbonized.

The dispersion of the quenching medium into the tar stream may be accomplished by any convenient means, such as, for example, a spray nozzle or a mixing venturi.

The tar stream leaving the downcomer is maintained at a temperature sufficiently high to insure that substantially no water is collected in the downcomer tar, but also low enough to obtain as much of the particulate matter as possible in the downcomer tar. In the operation of an entrained bed carbonizer for the treatment of lignite at about 950° F., the tar vapor stream has been quenched from a temperature of about 800° F. to a temperature desirably between 350° F. and 410° F. Below 350° F. the downcomer tar contains entrapped water, and above 410° F. a noticeable increase in particulate matter in the product tar collected after the downcomer is observed.

The re-entry of the downcomer recycle tar into the system may be made at any point prior to the dust collecting system. It should not be introduced into any area where the temperatures will produce cracking unless such is desired. With an entrained or fluidized bed, it may be introduced before or after the primary separator (the settling chamber of the dust collecting system). Desirable results are obtainable as long as there is at least one piece of dust collecting apparatus between the point of re-entry and the downcomer; however, it is preferred to pass the recycled tar through the several elements of the dust collecting system or the equivalent thereof so as to obtain a high degree of particulate removal efficiency which is at least equal to that of the original dust collecting system.

The present invention is especially adapted for use with a carbonizer of the types using entrained beds or fluidized beds. However, it is also applicable to coke-ovens or other fixed bed or moving bed varieties where a dust collection system is employed and wherein it is desired to reduce the particulate matter in the tar product.

Illustrative of the efficacy of the present invention are the following tables which indicate data on the tar obtained from the carbonization of lignite by a method employing an entrained bed at a temperature of about 940° F. in a system substantially as illustrated in the attached drawing. The tar vapors from the carbonizer were passed through a conventional dust collector system comprised of cyclones and electrostatic precipitators. Table 1 indicates the data obtained when the tar was treated in a dust collecting system and condensed in accordance with conventional practice. Table 2 indicates the data obtained when a portion of the tar was condensed in the downcomer by a water spray, then recycled and revaporized into the tar vapor stream at a point prior to the dust collecting system. The temperature of the tar vapor stream entering the downcomer was 860° F. and the outgoing temperature was 390° F. Water was sprayed into the tar vapor stream passing through the downcomer at the rate of about 1.4 gallons of water per gallon of tar. The product tar was condensed in the second or main condenser system and decanted for removal of water.

TABLE 1

*Crude tar analysis*

| | |
|---|---|
| $H_2O$, percent by weight | 2.6 |
| C–I (quinoline-insolubles), percent by weight | 5.0 |
| Tar Distillation, ASTM D20: [1] | |
|   Initial–170° C. | 0.6 |
|   170–235 | 13.7 |
|   235–270 | 11.9 |
|   270–300 | 13.4 |
|   300–Decomposition | 42.0 |
|   Residue at decomposition | 14.0 |
|   Loss | 4.4 |
|   Decomposition temp., °C. | 366 |
| Composition, vol. percent: [2] | |
|   Tar acids | 20.2 |
|   Tar bases | 3.8 |
|   Neutral oil | 76.0 |

[1] Corected for particulate matter.
[2] Method disclosed by G. U. Dinneen et al., "Shale Oil Naphthas: Analyses of Small Samples by Silica Gel Adsorption Method," Analytical Chemistry, vol. 19, p. 992 (1947).

TABLE 2

*Tar analyses*

| | Downcomer | Product |
|---|---|---|
| $H_2O$, Percent by wt | 0.4 | 1.9 |
| C–I (quinoline-insolubles), percent by wt | 16.2 | 1.3 |
| Tar Distillation, ASTM D20: | | |
|   Initial–170° C. | 0.2 | 0.8 |
|   170–235 | 0.9 | 15.3 |
|   235–270 | 2.0 | 12.1 |
|   270–300 | 6.2 | 14.4 |
|   300–Decomposition | 28.8 | 30.2 |
|   Residue at decomposition | 59.5 | 24.0 |
|   Loss | 2.4 | 3.2 |
|   Decomposition temp., °C. | 346 | 344 |
| Composition, vol. percent: | | |
|   Tar acids | 28.7 | 25.2 |
|   Tar bases | 5.1 | 4.0 |
|   Neutral oil | 66.2 | 70.8 |

As is evident from the preceding tables, the process of the present invention substantially reduces the particulate content of the product tar, facilitating the processing of such tar and also rendering it useful for electrode cokes and binder pitches. The process does not otherwise affect the nature or quantity of the tar product.

Having thus described the invention we claim:

In the process of recovering tar comprising carbonizing bituminous material, continuously conducting a stream of the resultant tar vapor containing particulate matter through dust collecting means, removing a substantial portion of the said particulate matter from the said stream in the said dust-collecting means, and condensing tar from the said stream subsequent to passage of the stream through the said dust-collecting means, the improvement comprising the steps of quenching the said stream between the said particulate removing step and the said condensing step sufficiently to condense part of the tar therein and remove particulate matter from the stream in the resultant condensate, and feeding the said condensate into the said tar vapor stream at a point intermediate the said carbonizing step and the said particulate-removing step in further operation of the said process.

References Cited in the file of this patent

UNITED STATES PATENTS

| | | |
|---|---|---|
| 1,912,245 | Bailey | May 30, 1933 |
| 2,016,051 | Rhodes et al. | Oct. 1, 1935 |
| 2,606,145 | Creelman | Aug. 5, 1952 |
| 2,625,465 | Dresser et al. | Jan. 13, 1953 |